May 31, 1938. G. SEDLMAYR 2,119,183
PARACHUTE
Filed Sept. 10, 1936
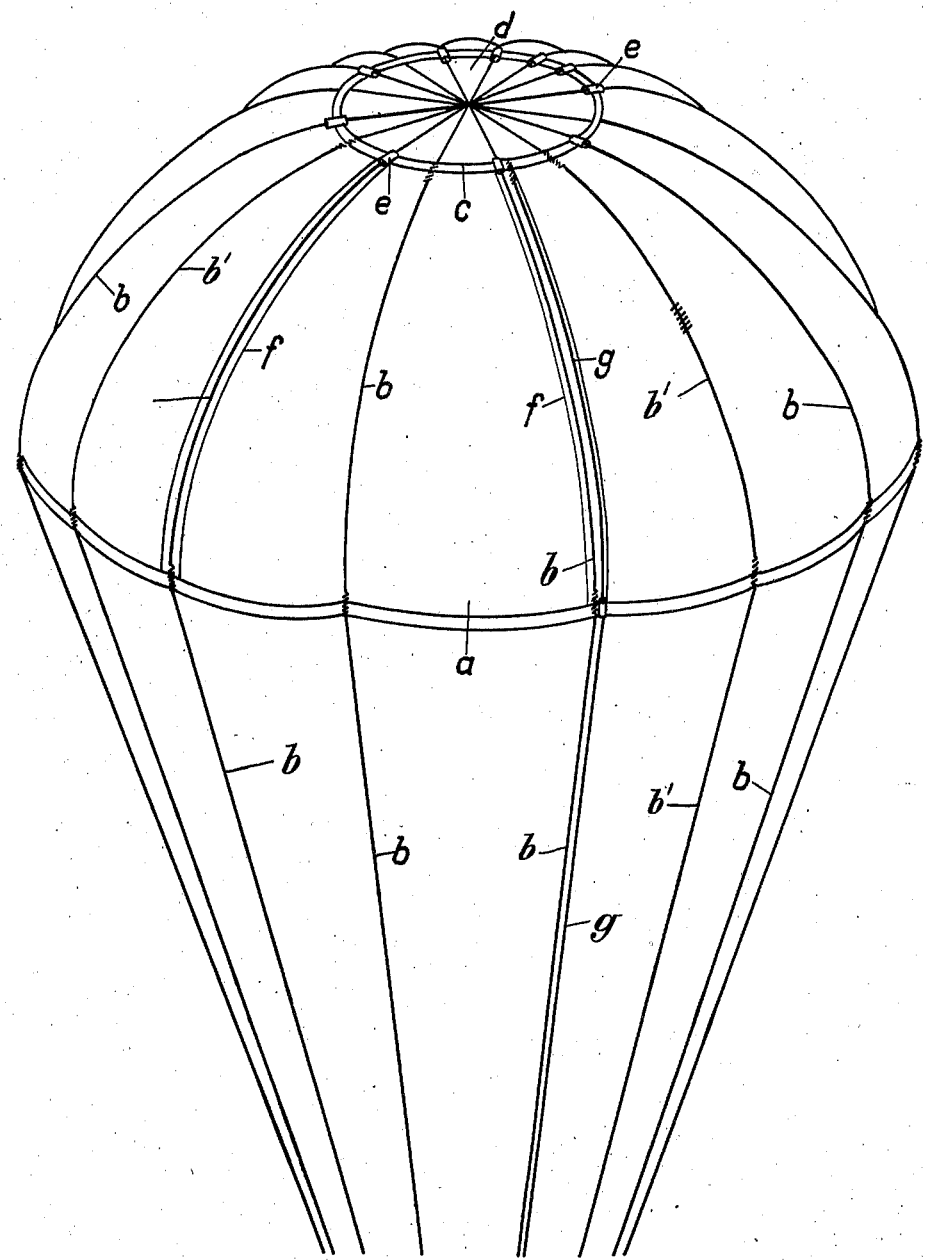
Inventor:
G. Sedlmayr
By Glascock Downing & Seebold
Attys.

Patented May 31, 1938

2,119,183

UNITED STATES PATENT OFFICE 2,119,183

PARACHUTE

Gerhard Sedlmayr, Berlin-Tempelhof, Germany

Application September 10, 1936, Serial No. 100,181
In Germany September 16, 1935

12 Claims. (Cl. 244—142)

Experience has shown that in parachute jumps or drops the opening shock or jerk does not always take place in the middle axis of the parachute body or canopy but usually excentrically, as a result of which a locally strictly limited violent stress is brought about on the parachute canopy which is attended by the danger of the canopy fracturing.

The object of this invention is to construct the parachute so that the danger of fracture which arises during excentric opening shock is removed by the canopy of the parachute being able to yield to the load shock or jerk.

Heretofore the shroud lines of parachutes have either been led and fixed only at the lower skirt of the parachute canopy, or also led up to the skirt of the air outlet opening situated at the vertex of the canopy and then fixed both here as well as at the lower skirt of the parachute canopy; it is also known to allow the shroud lines to run from one side of the parachute canopy over its vertex or the air outlet opening or vent down to the other lower skirt of the canopy, each individual suspension line then being fixed on each side of the vertex of the canopy or at the skirt of the air outlet opening as well as at the lower skirt of the body.

According to this invention the shroud lines guided from one side of the parachute canopy over the vertex to the other side are fastened on both sides only at the lower skirt of the parachute body, whilst on the other hand they are displaceably connected to the skirt of the vent, so that the parachute canopy can be displaced within certain limits on the carrier formed by the suspension lines. By this means the parachute canopy can yield to an excentric opening shock or jerk in consequence of this displaceability to such an extent that the stress brought about by the shock is distributed over a considerable part of the parachute body, and therefore the local danger of fracture is diminished. It is not absolutely necessary that all the suspension lines are moveably connected with the vertex of the parachute body or to the vent skirt; a part of the shroud lines may also be fixed at the top or skirt of the vent without removing the possibility of equalizing the stress during excentric opening shock.

According to a further constructional form of the invention pull lines or cords are loosely laid in all or in certain of the meridian seams or pockets, which pull lines are fixed at the top at the skirt of the vent and terminate below within the convenient reach of the jumper. By means of these pull lines the parachute canopy or the air outlet opening can be displaced or distorted on the carrier formed by the suspension lines, as a result of which the parachute can be steered to a certain extent and its speed of descent regulated.

The accompanying drawing shows one constructional form of the parachute provided by this invention by way of example.

At the edge of the parachute canopy $a$, which is made up in the known manner from sector-like panels, shroud lines $b$ and $b'$ are fixed which are led from one side of the body over the vertex to the other side. The lines $b'$ are securely connected with the skirt $c$ of the air outlet opening $d$. The lines $b$ are movably connected with the said skirt $c$; this movable connection can be effected in any desired manner, e. g. by fastening eyes or small collars or tubes $e$ to the skirt $c$ through which the lines $b$ are led. It is advisable to construct these guides for the lines so that the lines in them are able to move with the smallest possible friction. As a result therefore the parachute canopy on opening can be displaced to a considerable extent on the carrier formed by the shroud lines $b$ and so an equalization or compensation provided in the case of excentric opening shock.

Further, pull lines or cords $g$ may be loosely laid in all or in some meridian seams $f$, preferably uniformly distributed meridian seams, which pull lines at the top are fixed at the skirt $c$ of the vent $d$ or in the proximity thereof to the parachute body, and are led downwardly to within convenient reach of the jumper. By pulling on these lines, for example on one, the position or the shape of the air outlet opening $d$ can be varied with the consequence that the parachute can be steered and its rate of descent regulated.

What I claim is:—

1. A parachute comprising in combination a canopy having at least one air vent, and a plurality of suspension lines running from one side of the canopy over the vertex thereof to the other side, all of said lines being fastened to the lower skirt of the canopy and at least some of said lines being displaceably attached to the skirt of at least one air vent.

2. A parachute comprising in combination a canopy having an air vent, guiding elements attached to the skirt of said air vent, and a plurality of suspension lines running from one side of the canopy over the vertex thereof to the other side, all of said lines being fastened to the lower skirt of the canopy and at least some of said lines passing freely through said guiding elements.

3. A parachute comprising in combination a canopy having at least one air vent, guiding elements attached to the skirt of at least one of said air vents, and a plurality of suspension lines running from one side of the canopy over the vertex thereof to the other side, all of said lines being fastened to the lower skirt of the canopy and at least some of said lines passing freely through said guiding elements.

4. A parachute comprising in combination a canopy having an air vent, eye members attached to the skirt of said air vent, and a plurality of suspension lines running from one side of the canopy over the vertex thereof to the other side, all of said lines being fastened to the lower skirt of the canopy and at least some of said lines passing freely through said eye members.

5. A parachute comprising in combination a canopy having an air vent, tubular guide members attached to the skirt of said air vent, and a plurality of suspension lines running from one side of the canopy over the vertex thereof to the other side, all of said lines being fastened to the lower skirt of the canopy and at least some of said lines passing freely through said tubular guide members.

6. A parachute comprising in combination a canopy having at least one air vent, and a plurality of suspension lines running from one side of the canopy over the vertex thereof to the other side, all of said lines being fastened to the lower skirt of the canopy, whilst some of said lines are displaceably attached, and the rest securely attached, to the skirt of at least one air vent.

7. A parachute comprising in combination a canopy having at least one air vent, and a plurality of suspension lines running from one side of the canopy over the vertex thereof to the other side, all of said lines being fastened to the lower skirt of the canopy, whilst some of said lines are displaceably attached to the skirt of at least one air vent and others are securely attached to the surface of said canopy.

8. A parachute comprising in combination a canopy having at least one air vent, a plurality of suspension lines running from one side of the canopy over the vertex thereof to the other side, all of said lines being fastened to the lower skirt of the canopy and at least some of said lines being displaceably attached to the skirt of at least one air vent, and at least one pull line for controlling the rate and direction of descent loosely held on the surface of the canopy, one end of said pull line being directly attached to the canopy and the other end hanging within reach of the parachutist.

9. A parachute comprising in combination a canopy having at least one air vent, a plurality of suspension lines running from one side of the canopy over the vertex thereof to the other side, all of said lines being fastened to the lower skirt of the canopy and at least some of said lines being displaceably attached to the skirt of at least one air vent, and at least one pull line for controlling the rate and direction of descent loosely held on the surface of the canopy, one end of said pull line being attached to the skirt of at least one air vent, and the other end hanging within reach of the parachutist.

10. A parachute comprising in combination a canopy having at least one air vent, a plurality of suspension lines running from one side of the canopy over the vertex thereof to the other side, all of said lines being fastened to the lower skirt of the canopy and at least some of said lines being displaceably attached to the skirt of at least one air vent, and a meridian seam pocket on the canopy with a pull line for controlling the rate and direction of descent accommodated in said pocket, one end of said pull line being attached to the canopy, and the other end hanging within reach of the parachutist.

11. A parachute comprising in combination a canopy having at least one air vent, a plurality of suspension lines running from one side of the canopy over the vertex thereof to the other side, all of said lines being fastened to the lower skirt of the canopy and at least some of said lines being displaceably attached to the skirt of at least one air vent, and a plurality of meridian seam pockets on the canopy with a plurality of pull lines for controlling the rate and direction of descent accommodated in said pockets, said pull lines being attached to the canopy at one end and extending to within the reach of the parachutist at the other end.

12. A parachute comprising in combination a canopy having at least one air vent, a plurality of suspension lines running from one side of the canopy over the vertex thereof to the other side, all of said lines being fastened to the lower skirt of the canopy and at least some of said lines being displaceably attached to the skirt of at least one air vent, and at least one pull line for controlling the rate and direction of descent loosely held on the surface of the canopy, one end of said pull line being attached to the canopy in the proximity of a skirt of an air outlet opening, and the other end hanging within reach of the parachutist.

GERHARD SEDLMAYR.